United States Patent [19]
Florjancic

[11] 3,760,696
[45] Sept. 25, 1973

[54] CLOSURE DEVICE

[76] Inventor: Peter Florjancic, St. Martinstr. 12, Garmisch-Partenkirchen, Germany

[22] Filed: Mar. 11, 1971

[21] Appl. No.: 123,151

[30] Foreign Application Priority Data
Mar. 25, 1970  Austria.............................. A2793/70

[52] U.S. Cl........................... 92/129, 91/189, 92/61
[51] Int. Cl................................................. F16j 1/10
[58] Field of Search........................ 92/62, 129, 140, 92/61; 100/270, 271; 18/30 A, 30 B, 30 C, 30 D, 30 E, 30 F, 30 M, 30 LV, 30 LT; 91/189

[56] References Cited
UNITED STATES PATENTS
| | | | |
|---|---|---|---|
| 3,137,212 | 6/1964 | Rose | 91/189 |
| 3,345,691 | 10/1967 | Aoki | 18/30 LV |
| 3,423,502 | 1/1969 | Stimpson | 18/30 LV |
| 3,597,798 | 8/1971 | McDonald | 18/30 LV |
| 3,327,353 | 6/1967 | Eggenberger | 18/30 LA |
| 3,165,796 | 1/1965 | McDonald | 18/30 LM |

FOREIGN PATENTS OR APPLICATIONS
| | | | |
|---|---|---|---|
| 108,468 | 7/1967 | Denmark | 18/30 LV |
| 1,529,898 | 5/1969 | Germany | 18/30 LM |

*Primary Examiner*—Irwin C. Cohen
*Attorney*—Bryan, Parmelee, Johnson & Bollinger

[57] ABSTRACT

An improved closure apparatus for use with injection molding devices and the like in which a rigid brace pivoted into operative position between a force producing source and a reciprocating working member has a grooved sliding guide portion in which a slide ring is movable. The slide ring is pivotally connected to a piston rod actuable by a stationary hydraulic cylinder. The rigid brace is pivoted through an angle of 90° and means are provided for automatically controlling the actuation of the force producing source in dependency on the position of the rigid brace. The closure device is readily usable with a variety of mold heights.

3 Claims, 2 Drawing Figures

CLOSURE DEVICE

BACKGROUND OF THE INVENTION

This invention relates to an apparatus for reciprocating a working member to a working position for high pressure close working as particularly applied to an injection plastic molding apparatus.

In my copending application Ser. No. 43,706 entitled CLOSURE APPARATUS and filed June 5, 1970 now U.S. Pat. No. 3,691,913, I disclosed a working member which is mounted for reciprocating movement relative to a force producing source in an injection molding machine. In that invention a rigid brace is pivoted into operative position between the force producing source and the working member when the latter has reached a working region by means of a piston operatively seated in a cylinder, the cylinder being pivotally connected at a fixed fulcrum. The speed of the pivoting movement could thus be controlled.

SUMMARY OF THE INVENTION

In an apparatus for reciprocating a working member to a working position for high pressure working in accordance with the invention, a rigid brace is pivoted over an extended angle between generally transversely disposed positions. The working member is mounted for reciprocation along a line of advancement between a force producing source and a working region to perform high pressure work such as the closing of an injection mold. The rigid brace is mounted to pivot to a first position which is parallel with the line of advancement to a second pivoted position which is generally transverse to the line of advancement. With the rigid brace in the first pivot position, the force producing source and the working member are operatively coupled to one another through the rigid brace. In the second pivot position of the rigid brace the working member is retracted from the working region near the force producing source with the pivoted rigid brace therebetween to form a compact apparatus for reciprocating the working member.

In a closure apparatus utilizing a rigid brace with limited pivotal angular movement such as described in a specific embodiment in the above-identified copending application, the rigid brace is pivoted into operating position by means of a rod pivotally connected to the brace at one end and to a piston within a cylinder at the other end. The cylinder is pivotally mounted at a fixed fulcrum on the machine frame. An advantage of the improved closure apparatus in accordance with this invention resides in that the cylinder need not pivot and may be fixedly mounted.

An advantage of a closure apparatus in accordance with this invention is the reduction of the number of articulated joints and moving parts, as well as a short construction length of machine and a more efficient transmission of the high pressures.

An object of the invention, therefore, is the provision of a closure apparatus in which the rigid brace consists partially of a grooved sliding guide portion in which a slide ring or roller is movable. A piston rod is pivotally connected to the slide ring at one end and to a piston situated in a hydraulic cylinder at its other end. the hydraulic cylinder is stationary and fixably mounted.

As a result of fixably mounting the hydraulic cylinder the hydraulic fluid feed lines need not be flexible but can be constructed from rigid strong materials therefore reducing damage thereto. Moreover, the hydraulic cylinder may be placed in closer proximity to the force producing source and does not occupy any space in the region adjacent the working member in the working region or path. The latter features make the inspection and replacement of the cylinder possible with a minimum of inconvenience.

A further object of the invention is the provision of a means which permits automatic control of the actuation of the force producing means as a function of the rigid brace position. Moreover, the speed of the pivoting rigid brace is controllable.

Another object of the invention is the provision of a hydraulic closure device for injection molding machines in which a closure plate can be moved from an open position against an immovable clamping plate into a closed position by a hydraulic feed cylinder of relatively low power and high speed, the closure plate having a rod shaped rigid brace mounted for pivot movement in a vertical plane. The rigid brace pivots between the closing plate and a high pressure piston and is permitted to turn through an angle of at least 90° so that it may extend either parallel to or radially from the axis of the machine.

An additional advantage of the invention is that the rigid brace and cylinder may be used with injection molding machines of different sizes and heights since the only adjustment to be made is in the stroke of the piston of the hydraulic cylinder.

A further advantage is the improved ejection of the molded articles which may be permitted to drop down freely without interference from the rigid brace or hydraulic cylinder.

It is, therefore, an object of the invention to provide an improved closure apparatus for injection molding device and the like.

DESCRIPTION OF THE DRAWING

Other advantages and objects of the invention may be understood in the following description of embodiments of the invention schematically illustrated in their intermediate position between open and closed positions in the accompanying drawing in which.

DETAILED DESCRIPTION OF THE EMBODIMENTS

Figure 1:
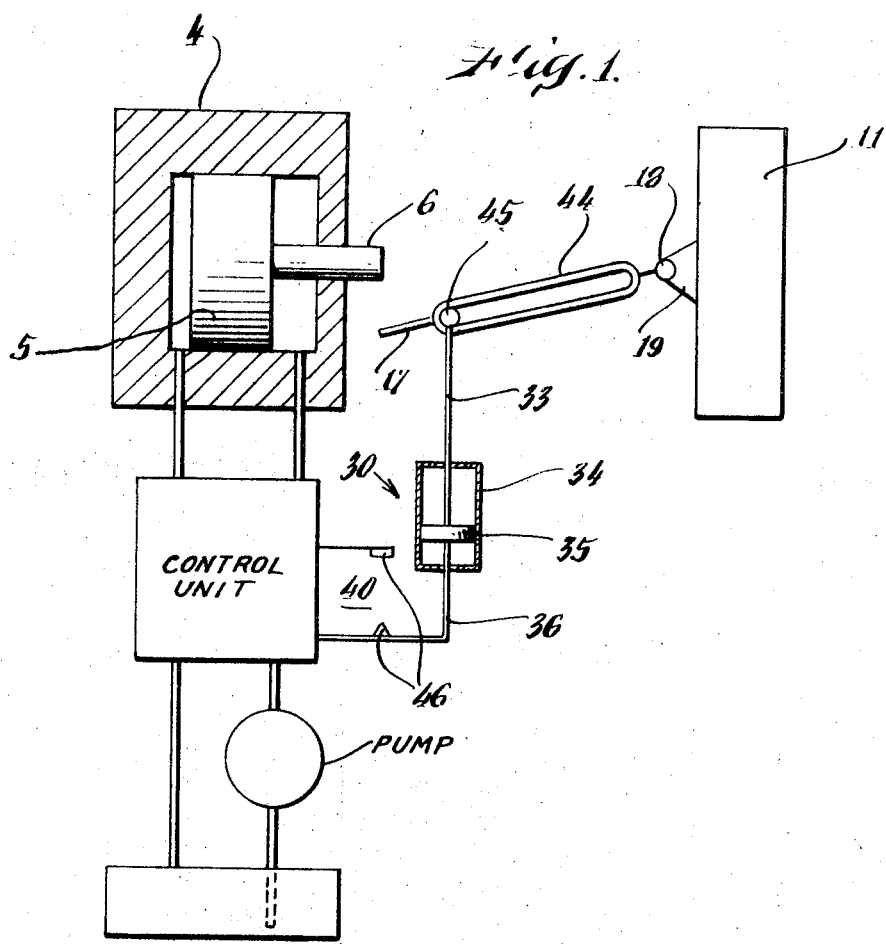
FIG. 1 illustrates an embodiment of the closure apparatus in which the rigid brace is linear, showing also, in labeled representation, the embodiment utilizing a control unit.

Referring to FIG. 1 there is shown a working member in the form of a closure plate 11 for an injection mold (not shown). Closing and opening motions of the closure plate 11 are hydraulically controlled by piston rods located in cylinders, which are fast acting but of relatively low force. The piston 5 is operatively located in a high pressure cylinder head 4 and is capable of producing a high pressure force. The just described components are more specifically shown and discussed in one of their intended environments, an injection plastic molding machine, in my copending application referred to above.

A rigid brace denoted generally at 17 is pivotally connected to the closure plate 11 by means of a fulcrum pin 18 passing through a pillow block 19 which is fixed to the closure plate 11. The central portion of the rigid brace 17 consists of a sliding guide 44 having a groove or track within which moves the slide ring or roller 45. The slide ring 45 is pivotally attached to the end of the piston rod 33 of a piston 35 which is operatively seated in a cylinder 34 of a hydraulic unit 30. The cylinder 34 is fixed in a stationary manner to the injection molding machine frame and receives its operating fluid via feed pipes (not shown) in the conventional manner.

The position of the components schematically corresponds to that shortly before the end of a closing movement. The closure plate 11 has been moved to the right by piston and cylinder means (not shown) and the piston 35 is acted upon from below causing the rod 33 to lift the rigid brace 17 through action of the guide 44 sliding on ring 45. The rigid brace 17 is lifted until it opposes the extension 6 of the high pressure piston 5 with its free end. Piston 5 is then actuated by pressure fluid and transmits great force through the rigid brace 17 to the closure plate 11 to strongly press the latter to the right against a rigid half of an injection mold (not shown). Upon completion of a desired operation, such as an injection molding step, the piston 5 is released by action of pressure fluid upon it from the right and the piston 35 is moved downward by means of fluid pressure acting upon its top surface. The components are then again in the position illustrated.

In further operation the closure plate 11 is moved to the left by a conventional return piston (not shown) causing the rigid brace 17 to swing downward while the sliding guide 44 slides over the non-moving slide ring 45. In the completely opened position of the closure plate 11 and the mold the rigid brace 17 assumes a substantially vertical position, extending radially from the axis of the machine. Thus, it is seen that the rigid brace is permitted to pivot through an angle of approximately 90°.

The construction and operation described requires that the rigid brace 17 and the hydraulic unit 30 be positioned laterally displaced from one another. Thus, the hydraulic unit 30 can be located outside of the machine axis a special advantage in machines with extremely high closing forces. Additionally, two laterally positioned rigid braces or a bifurcated rigid brace can be provided.

Another embodiment according to the invention utilizes a locking device to maintain the closure plate in the extreme closed position thus locking the mold. Referring to the drawing there is shown an arm 36 connected to the piston 35. A switch 40 diagramatically shown as a pair of contacts 46 controls release of the pressure fluid feed from the pump, represented by labeled representation, to the piston 5 for its movement by means of conventional control unit, as represented by the legend. Switch 40 is opened or closed depending upon the position of arm 36, the movement of which is controlled by the piston 35. When the piston 35 is in a uppermost position and rigid brace 17 extends between closure plate 11 and the extension 6, the contacts will touch one another thus closing switch 40. If there is an obstacle between the halves of the mold interfering with its closing, the relatively low power of the hydraulic unit 30 is insufficient to press the rigid brace entirely upward to a position parallel to the machine axis and therefore the contacts 46 cannot be closed. Since switch 40 is not closed the pressure fluid is not introduced behind piston 5 to actuate it therefore preventing damage to the halves of the mold, as for example caused by extrusion of material through a slit between mold halves.

The switch 40 also controls the pressure oil feed for the return of the piston 5. The rigid brace 17 is kept in its upright position due to the friction between its free end and the extension 6 of the piston 5 when piston 5 is acting upon it. The power of hydraulic unit 30 is insufficient to overcome this frictional force; however, as soon as the pivoting rigid brace 17 becomes free as the piston 5 moves to the left the piston 35 of hydraulic unit 30 moves downward causing arm 36 to move downward and open switch 40 thus interrupting the oil feed to the right hand side of the piston 5 which then ceases motion A distinct advantage of the invention, therefore, as compared to the conventional mold closing devices which are attached to the closure plates themselves is that the present improved closure device may be changed over to a mold of a different height without need of adjustment. The same switch 40 automatically causes the fluid requirement for the pressure piston 5 to be a minimum and the time of the opening to be as short as possible.

Figure 2:
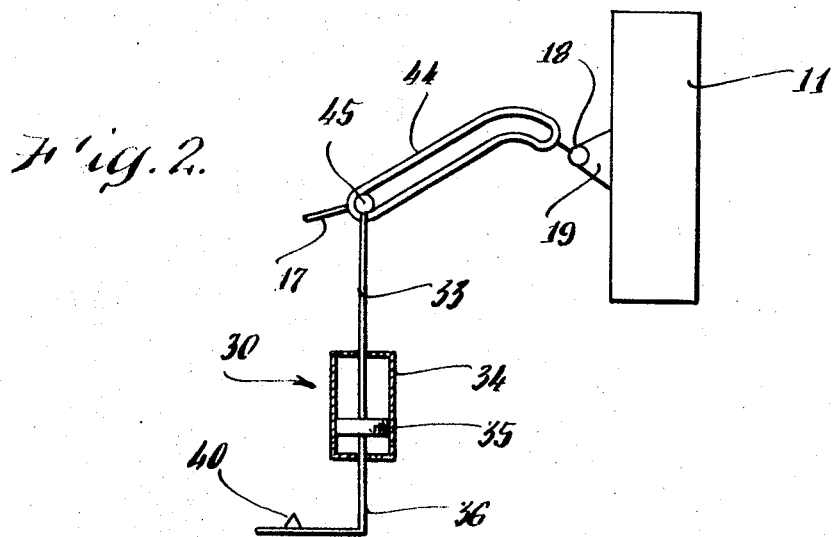
FIG. 2 illustrates an embodiment of the closure apparatus in which the rigid brace is curved.

Many different embodiments are possible within the framework of the invention. In particular, as shown in FIG. 2 having like numbers representing like elements of FIG. 1, the sliding path of the guide 44 of the rigid brace 17 need not be straight but may be shaped in a curve so as to influence the swinging or pivotal speed of the rigid plate in dependency upon the displacement of the closure plate 11. For example, the distance and space required for the swing can be reduced by shaping the sliding path in the vicinity of the closure plate concave and downwards. As a maximum, this part of the sliding path could run horizontal in the open position.

As an additional variant, the piston 35 of the hydraulic unit 30 could be rendered immovable while the cylinder 34 would carry a rod 33 and the sliding ring 45 and move about the piston 35. In this instance, a flexible pressure oil feed lines would be required or alternatively the pressure oil supply could be sent through hollow piston rod. Also, a mechanical force transmitting means could be substituted for the hydraulic unit 30.

What has been provided, therefore, is an improved rigid brace which may be pivoted through an angle of 90° rapidly and controllably into position between a working member and a high pressure applying means. In addition, the hydraulic fluid feed to the high pressure piston is made automatically controllable by the position of the rigid brace.

What is claimed is:

1. In an apparatus for moving a closure member along a line of advancement, the improvement comprising a rigid brace having a free end and a pivoted end, means pivotally connecting said pivoted end to said closure member for pivoting said brace from a first position in parallel alignment with the line of advancement to a second position generally transverse thereto, a force producing means arranged to abut said free end of the rigid brace and exert a force along the line of advancement when in the first position, the rigid brace being provided in its central longitudinal portion with a sliding guide having a groove therein, a slide ring positioned in the groove so as to slide therein, a cylinder with a piston therein, a movable rod attached to said piston, means coupling the slide ring to said movable rod, means stationarily mounting said cylinder relative to the other components and having an axis running substantially normal to the axis of the line of advancement of the closure member, to move the rigid brace to and from its position of alignment between the closure member and the force producing means.

2. An apparatus as claimed in claim 1 wherein the groove in the sliding guide of said rigid brace is curved near its pivoted end towards the direction in which the rigid brace extends when in the second position whereby the pivotal speed of the rigid brace is dependent in part on the displacement of the closure member and the space required for the positioning is significantly reduced.

3. An apparatus as claimed in claim 1, wherein said force producing means comprises a switch-controlled hydraulically operated cylinder-piston assembly.

* * * * *